(12) United States Patent
Chen et al.

(10) Patent No.: US 9,715,479 B2
(45) Date of Patent: Jul. 25, 2017

(54) MEMRISTOR LINEAR MODELING METHOD FOR SWITCHED RELUCTANCE MOTOR

(71) Applicant: China University of Mining and Technology, Jiangsu (CN)

(72) Inventors: Hao Chen, Jiangsu (CN); Yan Liang, Jiangsu (CN); Dongsheng Yu, Jiangsu (CN)

(73) Assignee: China University of Mining and Technology, Xuzhou (CN)

( * ) Notice: Subject to any disclaimer, the term of this patent is extended or adjusted under 35 U.S.C. 154(b) by 329 days.

(21) Appl. No.: 14/378,629

(22) PCT Filed: Jan. 24, 2013

(86) PCT No.: PCT/CN2013/070929
§ 371 (c)(1),
(2) Date: Oct. 30, 2014

(87) PCT Pub. No.: WO2014/063452
PCT Pub. Date: May 1, 2014

(65) Prior Publication Data
US 2015/0220484 A1     Aug. 6, 2015

(30) Foreign Application Priority Data
Oct. 22, 2012  (CN) .......................... 2012 1 0403809

(51) Int. Cl.
*G06F 7/60*     (2006.01)
*G06F 17/11*    (2006.01)
*H02P 23/14*    (2006.01)
*H02P 25/08*    (2016.01)

(52) U.S. Cl.
CPC .............. *G06F 17/11* (2013.01); *H02P 23/14* (2013.01); *H02P 25/08* (2013.01)

(58) Field of Classification Search
CPC ....................................................... G06F 17/11
USPC ............................................................. 703/2
See application file for complete search history.

(56) References Cited

U.S. PATENT DOCUMENTS

| | | | |
|---|---|---|---|
| 2011/0119036 A1* | 5/2011 | Pino .................... | G06F 17/5036 703/2 |
| 2012/0194967 A1* | 8/2012 | Keane ................... | H01C 13/00 361/437 |
| 2013/0003438 A1* | 1/2013 | Merkel .................... | G11C 7/04 365/148 |

FOREIGN PATENT DOCUMENTS

| | | |
|---|---|---|
| CN | 102509152 A | 6/2012 |
| WO | 2014063452 A1 | 5/2014 |

OTHER PUBLICATIONS

International Search Report for PCT/CN2013/070929, dated Aug. 1, 2013, 3 pages.

(Continued)

*Primary Examiner* — Timothy A Mudrick
(74) *Attorney, Agent, or Firm* — TraskBritt P.C.

(57) ABSTRACT

A memristor linear modeling method for a switched reluctance motor. A non-inverting operational amplifier circuit and an inverting operational amplifier circuit are employed to construct a switched reluctance motor linear phase inductance characteristic element.

1 Claim, 1 Drawing Sheet

(56) References Cited

OTHER PUBLICATIONS

Dongsheng, Yu et al., "Analysis of chaotic behavior in switched reluctance motor drives based on Matlab" Journal of Southeast Univ. (Natural Science edition), vol. 37, supplement (I), pp. 62-65, Sep. 2007.
Duan, Zongsheng, et al., "An Improved Memristor SPICE model and Simulation," Microelectronics & Computer, vol. 29, No. 8, pp. 193-199, Aug. 2012.

* cited by examiner

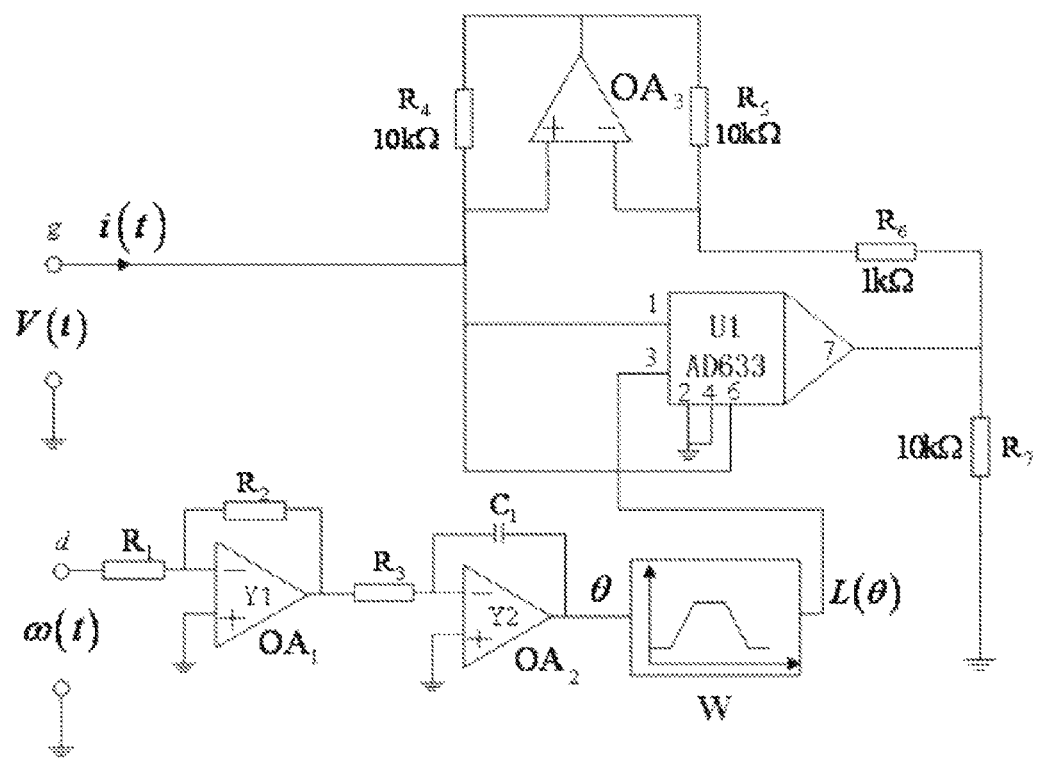

MEMRISTOR LINEAR MODELING METHOD FOR SWITCHED RELUCTANCE MOTOR

CROSS-REFERENCE TO RELATED APPLICATIONS

This application is a national phase entry under 35 U.S.C. §371 of International Patent Application PCT/CN2013/070929, filed Jan. 24, 2013, designating the United States of America and published as International Patent Publication WO 2014/063452 A1 on May 1, 2014, which claims the benefit under Article 8 of the Patent Cooperation Treaty to Chinese Patent Application Serial No. 201210403809.X 2012, filed Oct. 22, 2012.

TECHNICAL FIELD

This disclosure relates to electronic generally and more particularly to a memristor-based modeling method for switched reluctance motors, which is applicable to switched reluctance motors with any number of phases.

BACKGROUND

The modeling of a switched reluctance motor has direct influence on the optimal design, static and dynamic performance analysis, and evaluation of control strategy, etc., of the motor. It is difficult to apply the performance analysis and modeling methods for conventional motors to the modeling of switched reluctance motors, owing to the nonlinear electromagnetic property and close coupling among multiple variables in switched reluctance motors. A linear model of switched reluctance motor highlights the physical nature of internal electromagnetic relation in switched reluctance motors and sets a basis for the design and analysis of switched reluctance motors. The linear model of switched reluctance motor neglects nonlinear factors such as magnetic field saturation, eddy current, magnetic hysteresis, and interphase mutual inductance, etc., so that the inductance of each phase is only related with the positional angle of the rotor and independent of the phase current magnitude. Such simplification brings great convenience for analysis of the operating characteristics of switched reluctance motors. With that model, it is easy to obtain an analytical expression of phase current vs. electromagnetic torque of switched reluctance motors, and thereby, the rule of influence of status parameters such as turn-on angle, turn-off angle, and given voltage on the characteristics of motor can be analyzed conveniently, and the performance of control scheme for a switched reluctance motor can be assessed, so as to provide valuable reference for controller design and debugging.

A memristor is a passive two-terminal element and has unique memory function, and its resistance can be changed by controlling the voltage across it or the current flowing through it. Thanks to the memory function, memristors have a high application potential in nonvolatile memory unit, artificial neural network, and image processing fields. A mathematical model has to be set up to carry out theoretical analysis for switched reluctance motors. A key in the modeling is that the model must be able to reflect the inductance (or magnetic linkage) characteristics of switched reluctance motors. The memristor theory and method can be used to try to set up a model of switched reluctance motors, in which the phase inductance of switched reluctance motor is controlled by the positional angle of the rotor and the resistance change trend can be memorized.

DISCLOSURE

To solve the problems in the prior art, the disclosure described herein provides a memristor-based linear modeling method for switched reluctance motors, which is simple and can improve static and dynamic system properties, and implement real-time simulation and real-time control of the switched reluctance motor system.

The memristor-based linear modeling method for switched reluctance motors comprises:

a) connecting the input of a non-inverting operational amplifier circuit with the input of an inverting operational amplifier circuit as the input terminal θ of a linear phase inductance characteristic element of a switched reluctance motor, adding the output of the non-inverting operational amplifier circuit with the output of the inverting operational amplifier circuit via a non-inverting additional operational circuit as the output terminal L(θ) of the linear phase inductance characteristic element of the switched reluctance motor, to construct a linear phase inductance characteristic element W for the switched reluctance motor;

taking the positional angle θ of the rotor of the switched reluctance motor as the input of the linear phase inductance characteristic element of the switched reluctance motor, and obtaining a memorized conductance value L(θ) (i.e., phase inductance of the switched reluctance motor) from the output of the constructed linear phase inductance characteristic element of the switched reluctance motor;

b) treating the angular velocity ω(t) of the switched reluctance motor via a scaling operational circuit $OA_1$ and an integrator circuit $OA_2$ to obtain the positional angle θ of the rotor of the switched reluctance motor;

c) connecting a current reversing circuit $OA_3$ between an input terminal 1 of a multiplier U1 and an output terminal 7 of the multiplier U1;

d) connecting the output terminal L(θ) of the linear phase inductance characteristic element of the switched reluctance motor to an input terminal 3 of the multiplier U1, and connecting the terminal g of input current i(t) and input voltage V(t) to the input terminal 1 of the multiplier U1;

the input current i(t), the input voltage V(t) and the phase inductance L(θ) meeting the following relational expression:

$$i(t) = [\alpha \cdot L(\theta)] \cdot V(t),$$

where, α is a constant; in this way, a memristor-based linear model of switched reluctance motor is obtained.

Beneficial effects: with the method provided in this disclosure, based on the electromagnetic property of phase windings of a switched reluctance motor and an ideal linear inductance model, a memristor-based linear model of switched reluctance motor is set up, in which the phase inductance is independent of the phase current magnitude but is controlled only by the positional angle of the rotor, and the phase inductance can memorize the resistance change trend. The phase circuit model, which is a memristor-based model and reflects the phase inductance characteristics of a switched reluctance motor, in which the positional signal of rotor and phase inductance terminal voltage are considered as input variables of a three-terminal memristor, and the resistance of the memristor varies following the position change of the rotor. That method sets a basis for constructing a complete switched reluctance motor system model, and is helpful for implementing nonlinear analytical modeling and real-time control of switched reluctance motors. Application of a memristor to the switched reluctance motor model can facilitate integration and optimization of the model, is helpful for optimizing the design and control parameters of switched reluctance motors and effectively improving static and dynamic system properties, and can implement real-time simulation and real-time control of switched reluctance motor systems. Therefore, the method has broad application prospects.

BRIEF DESCRIPTION OF THE DRAWING

FIG. 1 is a schematic diagram of the memristor-based model of a phase circuit of a switched reluctance motor provided in the herein-described disclosure.

DETAILED DESCRIPTION

Hereunder, this disclosure will be further detailed in an embodiment, with reference to the accompanying drawing.

As shown in FIG. 1, the memristor-based linear modeling method for switched reluctance motors in the herein-described disclosure comprises:

a) connecting the input of a non-inverting operational amplifier circuit with the input of an inverting operational amplifier circuit as the input terminal θ of a linear phase inductance characteristic element of a switched reluctance motor, adding the output of the non-inverting operational amplifier circuit with the output of the inverting operational amplifier circuit via a non-inverting additional operational circuit as the output terminal L(θ) of the linear phase inductance characteristic element of the switched reluctance motor, to construct a linear phase inductance characteristic element W for the switched reluctance motor;

taking the positional angle θ of the rotor of the switched reluctance motor as the input of the linear phase inductance characteristic element W of the switched reluctance motor, and obtaining a memorized conductance value L(θ) (i.e., phase inductance of the switched reluctance motor) from the output of the constructed linear phase inductance characteristic element W of the switched reluctance motor;

b) treating the angular velocity ω(t) of the switched reluctance motor via a scaling operational circuit $OA_1$ and an integrator circuit $OA_2$ at terminal d, to obtain the positional angle θ of the rotor of the switched reluctance motor, wherein, an operational amplifier Y1 in $OA_1$ works with an external resistor $R_1$ and an external resistor $R_2$ to provide proportional amplification function, and an operational amplifier Y2 in $OA_2$ works with an external resistor $R_3$ and an external capacitor $C_1$ to provide integration function;

c) connecting a current reversing circuit $OA_3$ between an input terminal 1 of a multiplier U1-AD633 and an output terminal 7 of the multiplier U1-AD633, wherein, the external resistors $R_4$ and $R_5$ have the same resistance, i.e., $R_4=R_5=10$ kΩ, the external resistor $R_6=1$ kΩ, and the external resistor $R_7=10$ kΩ; input terminals 2 and 4 of the multiplier U1-AD633 are grounded, and an input terminal 6 of the multiplier U1-AD633 is also connected to the terminal g;

d) connecting the output terminal L(θ) of the linear phase inductance characteristic element W of the switched reluctance motor to an input terminal 3 of the multiplier U1, and the input voltage V(t) at the terminal g is connected to the input terminal 1 of the multiplier U1-AD633;

e) input current i(t) at the terminal g, input voltage V(t) at the terminal g and phase inductance L(θ) meeting the following relational expression:

$$\alpha = \frac{1}{10R_6} = \frac{1}{1000}$$

$i(t)=[\alpha \cdot L(\theta)] \cdot V(t),$ where, α is a constant;

in that way, a memristor-based linear model of switched reluctance motor is obtained.

The invention claimed is:

1. A memristor-based linear modeling method for switched reluctance motors to obtain a memristor-based linear model of a switched reluctance motor, the method comprising:

connecting an input of a non-inverting operational amplifier circuit with an input of an inverting operational amplifier circuit as the input terminal θ of a linear phase inductance characteristic element of a switched reluctance motor, adding the output of the non-inverting operational amplifier circuit with the output of the inverting operational amplifier circuit via a non-inverting additional operational circuit as the output terminal L(θ) of the linear phase inductance characteristic element of the switched reluctance motor, to construct a linear phase inductance characteristic element W for the switched reluctance motor;

taking a positional angle θ of the rotor of the switched reluctance motor as the input of the linear phase inductance characteristic element of the switched reluctance motor, and obtaining a memorized conductance value L(θ) comprising the phase inductance of the switched reluctance motor from the output of the constructed linear phase inductance characteristic element of the switched reluctance motor;

treating an angular velocity ω(t) of the switched reluctance motor via a scaling operational circuit $OA_1$ and an integrator circuit $OA_2$, to obtain the positional angle θ of the rotor of the switched reluctance motor;

connecting a current reversing circuit $OA_3$ between an input terminal of a multiplier U1 and an output terminal of the multiplier U1;

connecting the output terminal L(θ) of the linear phase inductance characteristic element of the switched reluctance motor to an input terminal of the multiplier U1, and connecting the terminal g of input current i(t) and input voltage V(t) to the input terminal of the multiplier U1;

the input current i(t), the input voltage V(t) and the phase inductance L(θ) meeting the following relational expression:

$i(t)=[\alpha \cdot L(\theta)] \cdot V(t),$ where, α is a constant.

* * * * *